United States Patent
Krikellas et al.

(10) Patent No.: US 9,104,500 B1
(45) Date of Patent: Aug. 11, 2015

(54) LOCK-FREE JOB SCHEDULER FOR MULTI-PROCESSOR SYSTEMS

(75) Inventors: Konstantinos Krikellas, San Mateo, CA (US); Florian Michael Waas, San Francisco, CA (US); Mohamed Soliman, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 883 days.

(21) Appl. No.: 13/248,589

(22) Filed: Sep. 29, 2011

(51) Int. Cl.
*G06F 9/46* (2006.01)
*G06F 9/52* (2006.01)

(52) U.S. Cl.
CPC .......................................... *G06F 9/52* (2013.01)

(58) Field of Classification Search
CPC ............................................................ G06F 9/52
See application file for complete search history.

(56) References Cited

U.S. PATENT DOCUMENTS

| | | | |
|---|---|---|---|
| 3,662,401 A * | 5/1972 | Collins et al. | 718/103 |
| 4,847,754 A * | 7/1989 | Obermarck et al. | 718/104 |
| 7,103,628 B2 * | 9/2006 | Neiman et al. | 709/201 |
| 7,624,237 B2 * | 11/2009 | Greiner et al. | 711/150 |
| 8,028,285 B2 * | 9/2011 | Ly et al. | 718/102 |
| 2011/0145829 A1 * | 6/2011 | Molnar et al. | 718/104 |
| 2012/0102500 A1 * | 4/2012 | Waddington et al. | 718/104 |
| 2012/0159495 A1 * | 6/2012 | Rajagopalan et al. | 718/102 |

* cited by examiner

*Primary Examiner* — Meng An
*Assistant Examiner* — James J Lee
(74) *Attorney, Agent, or Firm* — Barry N. Young (57) ABSTRACT

A scalable job scheduler for a multi-thread, multi-processor system synchronizes and schedules jobs for execution by using lists and jobs counters for the numbers of active jobs. It minimizes synchronization overhead by using atomic operations for incrementing and decrementing the counters. The scheduler assigns jobs for execution, and can awake up an available thread to pick up work. A parent job spawns child jobs and maintains a job counter. Spawned jobs are added to the list for execution and the counter of waiting jobs is incremented. When execution of a job begins, the parent's counter of outstanding child jobs is decremented. A parent job is suspended until its counter of uncompleted spawned child jobs reaches zero. As a job is completed, the scheduler decrements the counter of active jobs, and assigns the next job in the queue to an available thread.

10 Claims, 7 Drawing Sheets

| Executing jobs | 5 |
| --- | --- |
| Waiting jobs | 6,7 |
| Suspended jobs | 1,2,3 |

Figure 3E

| Executing jobs | 2,6 |
| --- | --- |
| Waiting jobs | 7 |
| Suspended jobs | 1,3 |

| Executing jobs | 3 |
| --- | --- |
| Waiting jobs | |
| Suspended jobs | 1 |

Figure 3I

| Executing jobs | 1 |
| --- | --- |
| Waiting jobs | |
| Suspended jobs | |

Figure 3J

LOCK-FREE JOB SCHEDULER FOR MULTI-PROCESSOR SYSTEMS

BACKGROUND

This invention relates generally to multi-processor systems, and more particularly to providing an efficient, scalable, user-friendly framework for parallel execution of jobs in computationally intensive processing environments.

The advent of multi-core CPUs comprising two or more execution cores on a single die (chip) that execute multiple processing threads (including processes, kernel-space or user-space threads) simultaneously in parallel has increased the per-socket processing throughput of microprocessors, but poses a new challenge to the software industry, i.e., how to effectively use multi-threading for computationally intensive problems with minimal synchronization overhead. Multi-processor systems prove very efficient when a workload contains long-running and independent work units (jobs). For example, on web servers, each incoming request is independent of others so it can be scheduled to execute on a separate core without interacting with threads running on other cores (for static web content). However, many other more complex and demanding workloads involve jobs with intricate inter-dependencies. A job may involve side computations, for example, to build or retrieve required input data and/or produce an output for other jobs. Thus, a "parent" job may spawn one or more other dependent "child" jobs (children) that must complete before the parent job itself completes. While multi-processor systems advantageously enable jobs to be separated and executed simultaneously in parallel in separate processing threads, the jobs must be synchronized and their execution coordinated because of their dependencies. This is particularly so for solving computationally intensive problems.

Job dependencies have been traditionally resolved using synchronization primitives such as mutexes (processing locks) and event signaling, in which a parent job waits for its children jobs to notify the parent job to indicate that they have completed before the parent job resuming its processing. Threads may also notify each other that there is available work to pick up. However, processing locks and signaling require operating system (OS) involvement, and, as such, are too expensive. They are too costly for use in synchronizing and scheduling short-running jobs, e.g., less than 10,000 CPU cycles per job, and far too inefficient for optimal multi-core, multi-threaded processing of more complex jobs.

What is needed are job scheduling and synchronization approaches for use with multi-processor systems that afford an efficient framework that enables jobs to be suspended when spawning children and to be resumed when the children complete, while avoiding the use of locks. Additionally, for optimum processing, the framework should identify common tasks (jobs) that are semantically equivalent and required for multiple purposes so that they may be executed once instead of multiple times to avoid wasting resources. Moreover, multi-threaded programs are notoriously difficult to develop, program and debug, particularly for a complex workflow. Accordingly, the scheduling framework should desirably be simple, intuitive to use, and preferably hide the intricacies of parallel programming from the application developer.

It is desirable to provide systems and methods that address the foregoing and other problems of scheduling computational jobs to processing threads running on multi-processor systems and that achieve the above objectives. It is to these ends that the present invention is directed.

DESCRIPTION OF PREFERRED EMBODIMENTS

The invention is particularly well adapted for query optimization in a multi-threaded program with job dependencies, and will be described in that context. As will be appreciated, however, this is illustrative of only one utility of the invention and that the invention may be employed with other types of processing systems, including multi-processor systems, multi-core CPU systems, and single-core CPU systems.

Figure 1:
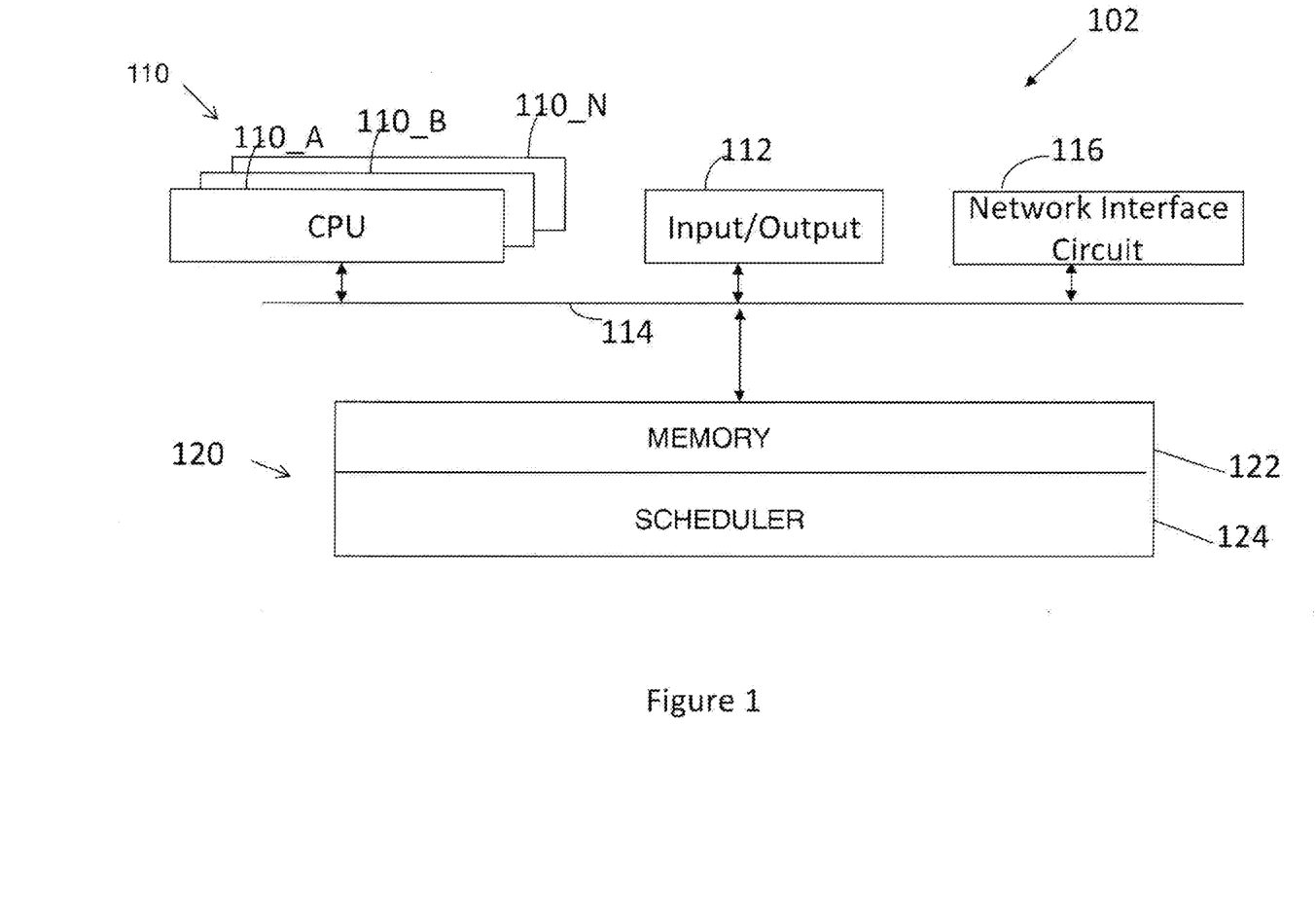
FIG. 1 illustrates a multi-processor system architecture of the type in which a scheduler in accordance with an embodiment of the invention may be employed.

FIG. 1 is a diagrammatic view that illustrates a multi-processor, multi-threaded processing system 102 of the type in which a scheduling system and process in accordance with an embodiment of the invention may be embodied. As shown, the system may comprise a multi-core processor 110 comprising a chip or die having a plurality of separate and independent CPU execution cores 110_A-110_N for simultaneously executing in parallel multiple processing threads of a workflow. Each core may comprise a CPU, interrupt logic, execution units, and a cache to enable the core to run a process independently. The system may further comprise user input/output devices 112 for interfacing with the system. The system may be a standalone multi-processor system, or it may be a processing system in a networked environment, in which case the system may include a network interface circuit 116 for external communications connected together with cores 110_A-N to a communication bus 114. The system may further comprise storage memory 120 comprising conventional physical (non-transitory) computer readable media such as semiconductor, magnetic, and optical media, and the like, for storing executable instructions (computer programs) for controlling the operations of the CPUs of the multiple cores. Memory 120 may comprise a main memory 122 for storing, for example, operating system and application programs, data, etc. A portion 124 of memory 120 may store a scheduler program in accordance with the invention comprising instructions for synchronizing and coordinating the operations of the execution cores to execute workflow jobs that runs on the an execution core or of the system 102. In addition to the operating system and application programs, each of processing cores may also execute scheduler program instructions.

As will be described, the invention affords a highly scalable scheduler system and method that synchronize, coordinate, and optimize multiple processing threads in a multi-processor environment without using locks. A scheduler in accordance with the invention can synchronize, monitor and schedule jobs, and coordinate their creation, running, suspension and resumption, as well as account for job dependencies. The scheduler may perform these functions without employing processing intensive locks by using low processing overhead atomic operations, such as compare-and-swap, to update lists of jobs and counters indicating numbers of active (running, suspended and queued) jobs. The scheduler may maintain internally sets (lists) of jobs that can execute, map (assign) jobs to available processing threads, notify available threads to wake up and become active when there are jobs to handle, and enable parent jobs to resume when their child jobs complete.

Figure 2:
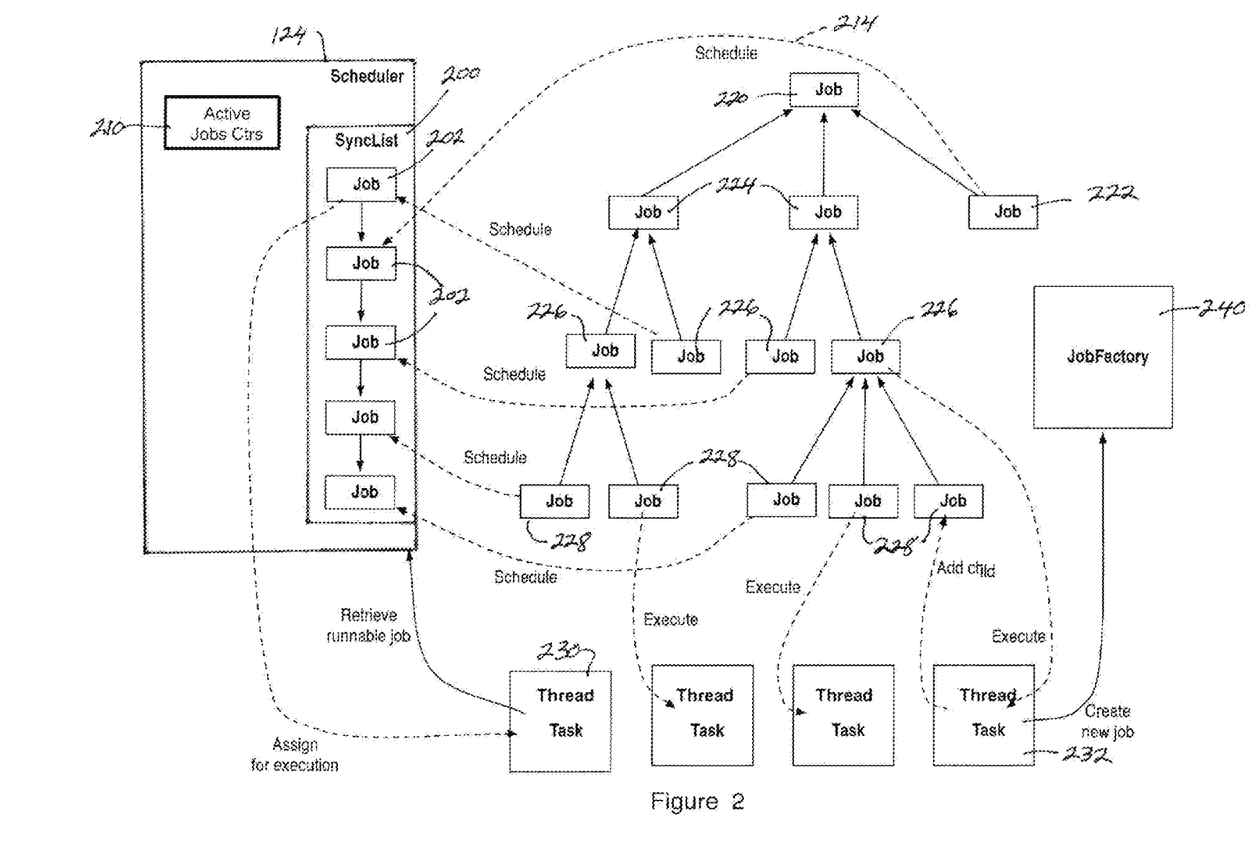
FIG. 2 is an overview of the architecture of the scheduler of the system of FIG. 1 and its functioning in connection with jobs and threads.

FIG. 2 illustrates an overview of the architecture of the scheduler 124 of FIG. 1, and its functioning in connection with scheduling, coordinating and synchronizing multiple jobs and threads. As shown in the figure, scheduler 124 may have one or more lists of jobs, including a lock-free list 200 (SyncList) of queued jobs 202 awaiting execution, and may have active jobs counters 210 comprising counters that maintain current numbers of active (running, suspended and queued) jobs. The lists and the counters are atomically updated in order to minimize synchronization overhead.

As shown in the figure, when a parent job, e.g., 220, is dependent on the results of other jobs, it may spawn multiple child jobs 222, 224 to satisfy such dependencies, and each child job 224 may itself become a parent job and spawn other child jobs 226 as determined by its dependencies. Child jobs 226 may similarly spawn their own child jobs 228. Jobs are spawned by the threads executing the processing tasks. For instance, thread 232 executing a task of a job 226 may create a new child job 228, as indicated in the figure. The dependencies are determined by the programmer who develops and programs the tasks for a given processing workflow. As shown, this process of spawning jobs because of dependencies results in a hierarchy of a plurality of jobs which need to be scheduled, synchronized and executed. This is handled by the scheduler 124. The complexity of this hierarchy is determined by the particular processing tasks of the workflow involved as constructed by the programmer. This workflow may comprise, for example, finding the optimal plan for a complex query to execute in a distributed database. The invention is used to solve this optimization problem in a parallel fashion with minimal synchronization overhead.

Each time a parent job, e.g., job 220, spawns a new child job, e.g., job 222, it atomically increments an internal counter of pending child jobs (to be described), assigns (214) the job 222 to the scheduler 124 for execution, and suspends its execution pending completion of its child jobs. The scheduler increments a total active jobs counter (210), adds the spawned new job to the sync list 200 of queued jobs, and increments a counter in 210 of queued jobs awaiting execution. Such atomic primitives are very "lightweight" and efficient since they operate in user space and do not require intervention of the operating system. Thus they involve only a few CPU cycles. In one embodiment, the scheduler does not track suspended jobs. The scheduler adds the newly spawned child job 222 to the list 200 of waiting jobs and increments the counter 210 of active jobs. The list of waiting job is used to schedule and assign a job, e.g., job 202, for execution. A thread, e.g., thread 230, retrieves a runnable job from the list and executes. A parent job may spawn multiple child jobs that execute in parallel. When a parent job spawns a child job, the parent job is suspended, as noted, until its children complete, at which point the parent job's dependencies are resolved and the parent job resumes. Each job has an associated jobs counter that maintains a count of the number of uncompleted child jobs. Upon a child job completing, the jobs counter of its parent job is decremented, the total active jobs counter of the scheduler is decremented, the next job from the queued list of waiting jobs is retrieved, the queued jobs counter is decremented, and the job is retrieved for execution. Execution begins with scheduling a root job 220, and completes when the number of active jobs becomes zero. A job factory 240 may be shared by all threads 230, 236 to allocate and recycle jobs using lock-free atomic operations. The functions of the scheduler are preferably hidden behind a scheduler API so that the user (programmer) does not need to know how it operates or to be concerned with job synchronization and scheduling.

The total number of queued jobs is used to control how many processing threads are used. The scheduler may initialize the thread counter 212 with the maximum number of threads to use. The threads continue executing jobs until there is no work left in the scheduler's queue of waiting jobs. When the number of waiting jobs exceeds a predetermined threshold value, e.g., 10, and there are idling threads, one of the threads may wake up (notify) another thread if one is available to pick-up waiting work (jobs). The threshold may be used to ensure that there is enough work for a thread to run for a substantial interval. This minimizes thread communication.

Multiple threads may participate in the lifecycle of a job. One thread may create a job, another may execute it for the first time, and a third may resume its execution and release it. Each thread may pass a global (thread-safe) and a local (single-threaded) memory pool to every job it executes; the former is used to create objects that are shared by all jobs while the latter is used as scratch space for temporary objects. This separation allows for use of purpose-specific memory pools during job execution. Since Job lifecycle may be short and expand over multiple threads, to avoid the processing cost of synchronizing job creation and destruction, the scheduler may use the job factory 240 to allocate, track and recycle the pool of jobs, and may update its internal accounting of jobs through atomic operations with no locking. Moreover, the scheduler may use job queues to identify semantically equivalent jobs, and, upon a first thread starting to execute one of these jobs, suspend execution of the other equivalent jobs. When the processing thread completes the first job, it updates the semantically equivalent jobs which were suspended. Thus, such jobs are executed only once, thereby minimizing processing resources.

FIGS. 3A-3J comprise a sequence of diagrammatic views that illustrate an example of a scheduling and synchronization process in accordance with the invention. For the purposes of this example, it is assumed that there are two threads, Thread A and Thread B that may be woken up when there is one queued job awaiting execution. In this example, jobs are indicated in the figures by circles, and the number in the circle refers to the job number. The tables in the figures of executing jobs, waiting jobs and suspended jobs may comprise lists in the scheduler.

Figure 3A:
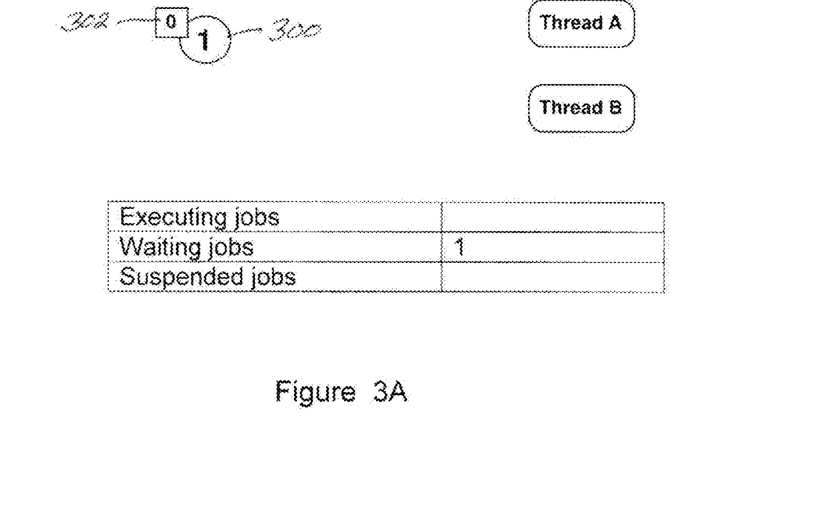
FIGS. 3A-J are diagrammatic views that illustrate a scheduling mechanism in accordance with the invention.
Figure 3B:
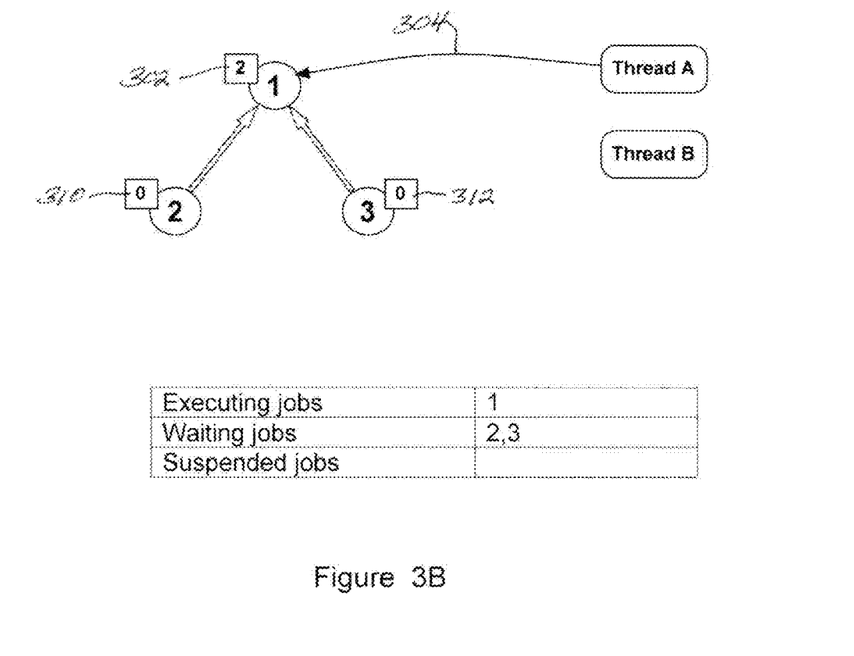

Referring to FIG. 3A, upon a root job 1 (300) be initially added to the lock-free job list, it becomes a waiting job as indicated in the table in FIG. 3A. At this point, there are no executing jobs or suspended jobs, as indicated in the table. Additionally, at this point the root job 1 has not created any child jobs. Accordingly, its child job counter 302 is at "0", indicating that there are no child jobs. In FIG. 3B, Thread A removes the root job 1 from the job queue and begins executing it, as indicated by the line 304. Assuming that the function of the executing root job 1 has dependencies that require two child jobs, new child jobs 2 and 3 are spawned and added to the list of waiting jobs, as indicated in the table in FIG. 3B. Job 1 is now a parent job that has two children, so that its child job counter 302 is updated to indicate "2". Child jobs 2 and 3 also have child job counters 310 and 312, respectively, which are at "0" since neither jobs 2 and 3 has any children. The two jobs are waiting to execute. Thread A wakes up thread B to start executing jobs.

Figure 3C:
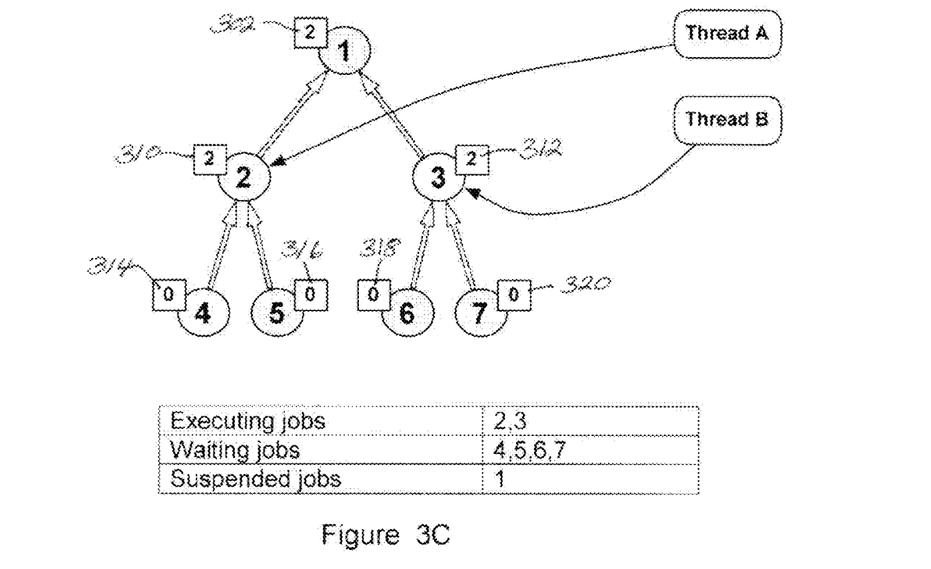

In FIG. 3C, Threads A and B remove jobs 2 and 3, respectively, from the waiting jobs list and execute them, as indicated by the arrows in the figure. Assuming that processing functions of jobs 2 and 3 are such that they each spawn two new child jobs, job 2 then has new child jobs 4 and 5, and job 3 has new child jobs 6 and 7. Child job counters 310 and 312 of jobs 2 and 3, respectively, are each updated to "2" by Threads A and B, respectively, to indicate that jobs 2 and 3 each has two children. The threads also update the jobs list to add the newly spawned jobs. As shown in the table in FIG. 3C, job 1 remain suspended, jobs 2 and 3 are executing, and jobs 4, 5, 6 and 7 are added to the list of waiting jobs. Since none of jobs 4, 5, 6 or 7 has any child jobs at this point, their corresponding child job counters 314, 316, 318 and 320, respectively, all indicate "0". At this point there are seven jobs.

Figure 3D:
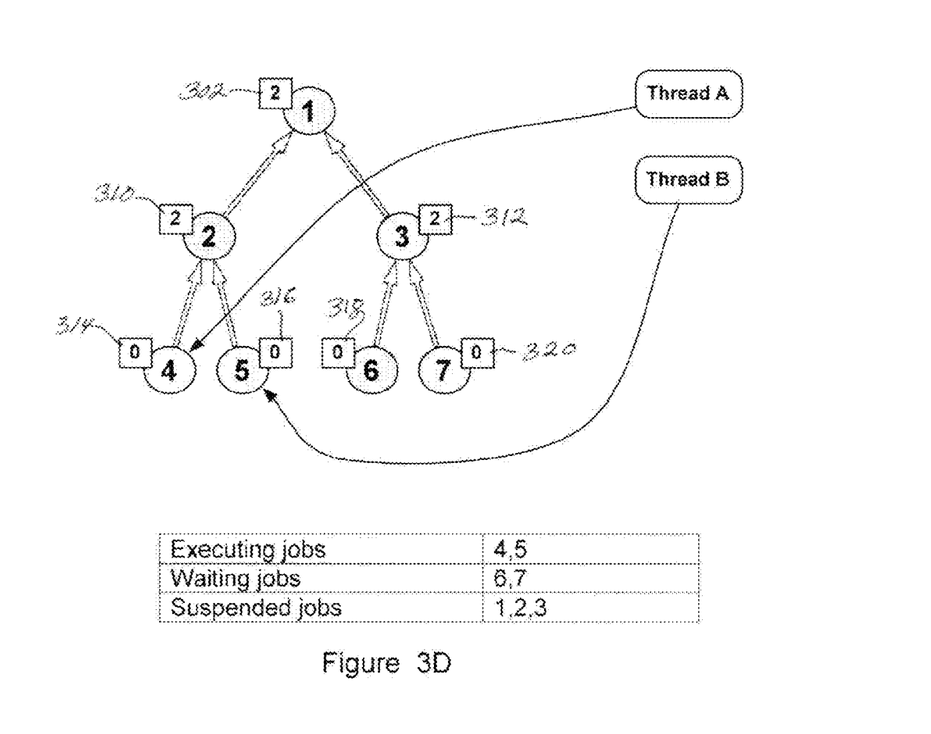

Next, as indicated in FIG. 3D, since jobs 2 and 3 have spawned new child jobs and have dependencies, jobs 2 and 3 are suspended. They will remain suspended until their respective child jobs complete. This frees up Threads A and B which become available for other work. Assuming that Thread A starts executing job 4 and that Thread B starts executing job 5, as shown by the arrows in the figure, jobs 4 and 5 are added to the list of executing jobs, and jobs 6 and 7 are added to the list of waiting jobs, as indicated in the table. Jobs 1, 2 and 3 remain suspended.

Figure 3E:
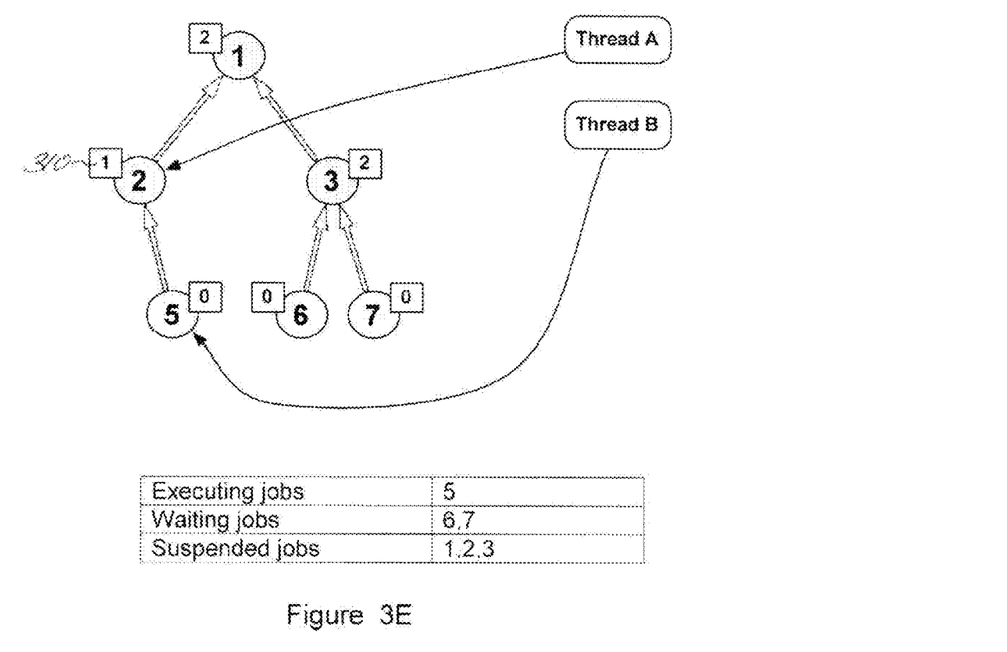

Referring to FIG. 3E, after completing job 4 Thread A atomically decrements child job counter 310 of parent job 2 as indicated by the arrow, and Thread A is freed up. Since counter 310 is greater than "0", there are still pending child jobs executing. i.e., job 5, so that job 2 is not resumed and remains suspended along with jobs 1 and 3, as shown in the table in the figure. Jobs 6 and 7 remain in the queue of waiting jobs.

Figure 3F:
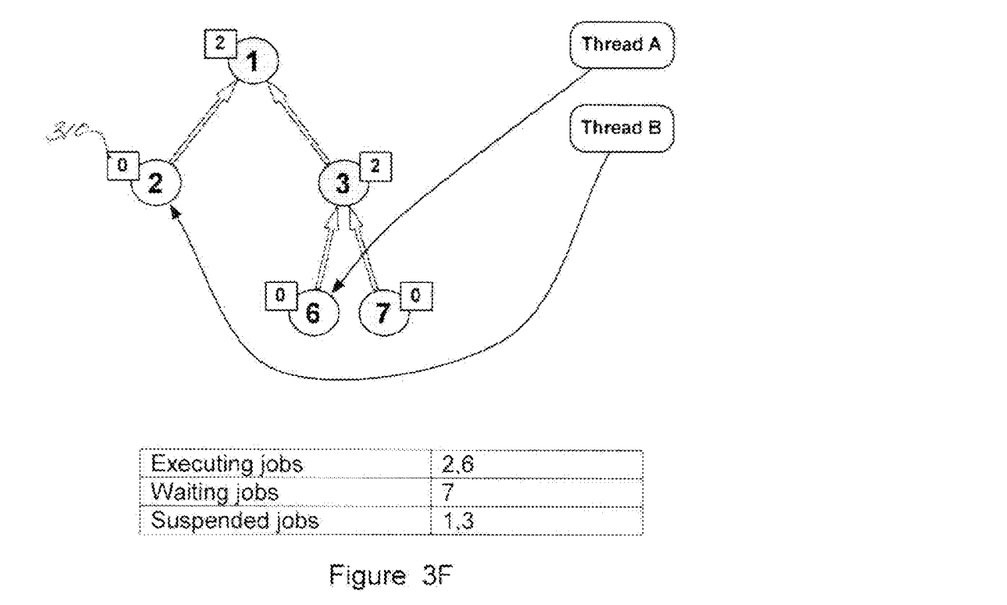

Referring to FIG. 3F, Thread A may begin executing job 6. Thread B completes job 5 and atomically decrements the counter 310 of parent job 2. Since counter 310 now goes to "0", job 2 may resume executing, and Thread B begins executing job 2. Thus, as indicated in the table in the figure, jobs 2 and 6 are executing, job 7 is in the queue of waiting jobs, and jobs 1 and 3 are suspended.

Figure 3G:
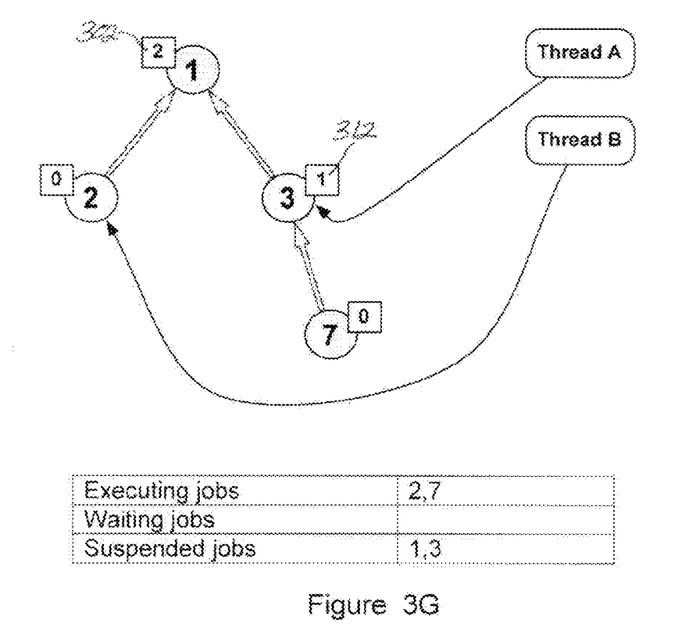

Referring to FIG. 3G, Thread A completes job 6 and updates (decrements) counter 312 of parent job 3. Job 3 is not yet runnable since it still has a pending child job (job 7) awaiting execution.

Figure 3H:
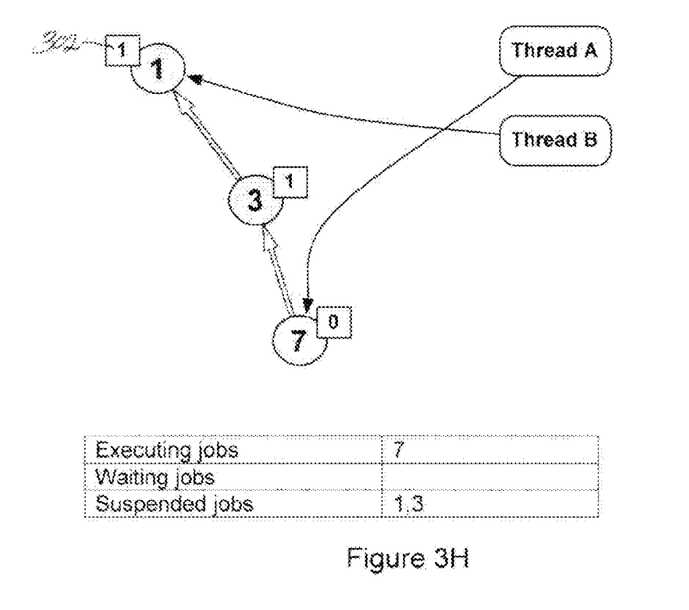

Referring to FIG. 3H, Thread B completes job 2 and updates the counter 302 of parent job 1. Job 1 is not yet runnable since it still has a pending child job 7. Thread A may remove job 7 from the waiting jobs list and execute it. Assuming job 7 has no dependencies, it need not spawn any child jobs. Accordingly, Thread A executes the job to completion. Jobs 1 and 3 are still suspended.

Figure 3I:
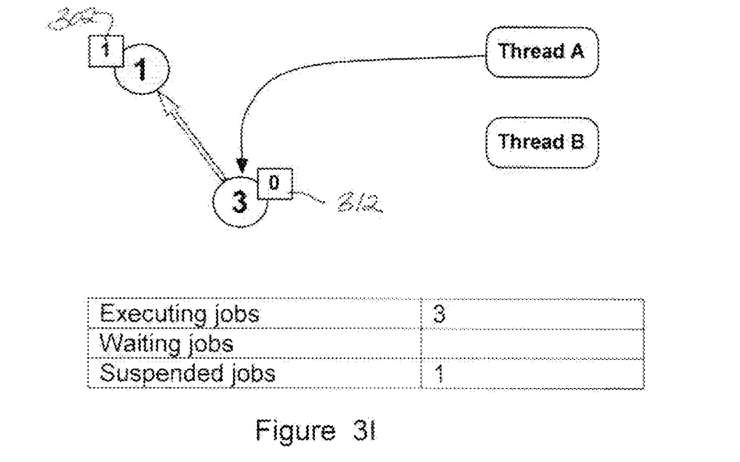

Referring to FIG. 3I, Thread B finds no job to execute and remains idle. Thread A decrements the job counter 312 of job 3 to "0". Since job 3 no longer has any pending children, Thread A executes it immediately. Thus, the table in the figure indicates that job 1 is suspended and job 3 is executing.

Figure 3J:
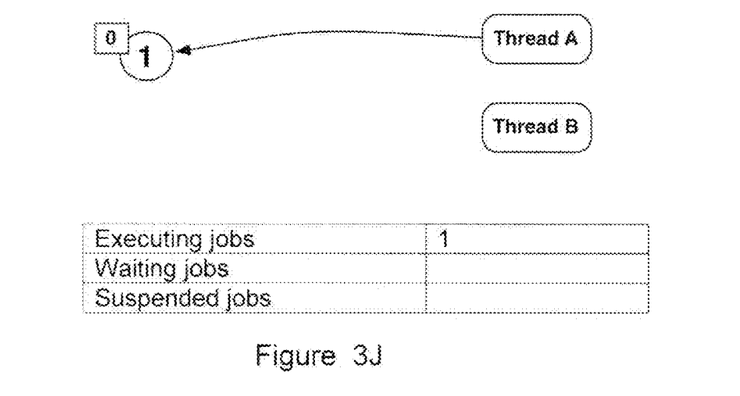

Finally, as indicated in FIG. 3J, after completing job 3, Thread A decrements the counter 302 of job 1 to "0" and executes the job to completion. At this point, all jobs are complete.

As may be appreciated from the foregoing, a scheduler in accordance with the invention by using atomic primitives to update counters and lists provides a very efficient scalable mechanism for scheduling and synchronizing processing workflow without the necessity of using processing-intensive locks such as mutexes or spin locks to manage processing threads. It uses job l lists and counters to keep track of pending and completed jobs, to assign jobs to transfer execution, to suspend jobs when they have dependent child jobs to complete, and to reassign suspended jobs for execution when their child jobs complete, all without using processing intensive locks and synchronization mechanisms. Moreover, the scheduler operates to schedule and synchronize multi-threaded processing completely independently of the specific processing of the application program and transparent to the application programmer. It can schedule, synchronize and assign threads to execute runnable jobs independently, simultaneously and in parallel without waiting for the results of a job complete. Thus, the programmer need not be concerned with developing and constructing programs that implement multi-threaded parallel execution, thereby substantially reducing programming complexity.

While the foregoing description has been with reference to particular embodiments of the invention, it will be appreciated that changes to these embodiments can be made without departing from the principles and the spirit of the invention, the scope of which is defined by the appended claims.

The invention claimed is:

1. A method of scheduling and synchronizing a plurality of jobs for execution by a plurality of processing threads in a multi-processor system, comprising:
    maintaining a list of jobs awaiting execution and counts of current numbers of the jobs on the list, of suspended jobs and of executing jobs;
    assigning jobs on the list of jobs to available threads among the plurality of processing threads for execution;
    upon an executing parent hob having dependencies spawning one or more child jobs corresponding to said dependencies, suspending execution of said parent job, updating said list with said child jobs, and incrementing a child jobs count associated with said parent job with a number of the child jobs spawned, said suspending, said incrementing and said updating said list with said child jobs being performed by atomic operations without use of locks;
    decrementing said child jobs count upon each child job completing execution, said decrementing being performed by atomic operations without the use of locks, and resuming execution of said suspended parent job in response to said child jobs count associated with said parent job becoming zero, wherein said resuming execution of said parent job comprises adding said parent job to the list of jobs, and retrieving said parent job from said list for execution by a thread; and
    updating said list and said counts in response to jobs on the list being assigned, suspended jobs resuming execution and executing jobs being completed, said assigning, maintaining and updating being performed by atomic operations without the use of locks.

2. The method of claim 1 further comprising incrementing a first count of jobs on the list upon spawning said one or more child jobs, and decrementing said first count upon said one or more child jobs completing execution.

3. The method of claim 1, wherein upon executing a child job having one or more dependencies, spawning other child jobs corresponding to said one or more dependencies, suspending execution of said child job having one or more dependencies, updating said list with said other child jobs, and incrementing another child job count associated with said child job having one or more dependencies according to a number of said other child jobs spawned.

4. The method of claim 1 further comprising notifying an available thread to become active and pick up a job on the list for execution upon a count of said jobs on the list exceeding a predetermined threshold.

5. A method of scheduling and synchronizing job execution in a multi-core, multi-thread CPU comprising:
- maintaining a list of jobs awaiting execution and active jobs counters respectively indicating numbers of executing jobs and suspended jobs;
- assigning jobs on the list of jobs to available threads among a plurality of threads for execution, and updating said list and the active jobs counters;
- upon an executing parent job spawning one or more child jobs, updating said list of jobs with said child jobs, suspending execution of the parent job, incrementing a child jobs counter associated with the parent job and said active jobs counters according to the number of child jobs spawned;
- in response to the execution of each of said one or more child jobs completing, decrementing said child jobs counter, and upon said child jobs counter becoming zero, resuming execution of said suspended parent job, updating said list to remove said completed child jobs and to add said resuming parent job, updating said active jobs counters, and retrieving said resuming parent job from said list for execution by a thread; and
- wherein said foregoing maintaining, assigning, updating of said list, and updating of said child jobs counter and said active jobs counters are performed using atomic operations without use of processing locks.

6. The method of claim 5 further comprising notifying an inactive thread to become active and pick up a job from said list for execution when there is a job on the list awaiting execution.

7. Computer readable non-transitory storage medium for storing instructions for controlling the operation of a computer to schedule and synchronize a plurality of jobs for execution by a plurality of threads in a multi-processor system, comprising instructions for:
- maintaining a list of jobs awaiting execution and counts of current numbers of the jobs on the list, of suspended jobs and of executing jobs;
- assigning jobs on the list of jobs to available threads among the plurality of threads for execution;
- upon an executing parent job having dependencies, spawning one or more child jobs corresponding to said dependencies, suspending execution of said parent job, updating said list with said child jobs, and incrementing a child jobs count associated with said parent job with a number of the child jobs spawned, said suspending, said incrementing and said updating said list with said child jobs being performed by atomic operations without use of locks;
- decrementing said child jobs count upon each child job completing execution, said decrementing being performed by atomic operations without the use of locks, and resuming execution of said suspended parent job in response to said child jobs count associated with said parent job becoming zero, wherein said resuming execution of said parent job comprises adding said parent job to the list of jobs, and retrieving said parent job from said list for execution by a thread; and
- updating said list and said counts in response to jobs on the list being assigned, suspended jobs resuming execution and executing jobs being completed, said assigning, maintaining and updating being performed by atomic operations without the use of locks.

8. Computer readable non-transitory storage medium according to claim 7 further comprising instructions for incrementing said first count of jobs upon spawning said one or more child jobs.

9. Computer readable non-transitory storage medium according to claim 7, wherein upon an executing child job with dependencies spawning one or more other child jobs, said instructions comprise instructions for suspending execution of said child job having dependencies, updating said list with said one or more other child jobs, and incrementing another child job count associated with said child job having dependencies with a number of other child jobs spawned.

10. Computer readable non-transitory storage medium according to claim 7 further comprising instructions for notifying an available thread to become active and pick up a job on the list for execution upon a count of jobs on the list exceeding a predetermined threshold.

* * * * *